United States Patent
Fradkin et al.

(10) Patent No.: US 12,214,383 B2
(45) Date of Patent: *Feb. 4, 2025

(54) ROBOTIC SYSTEM FOR PERFORMING PATTERN RECOGNITION-BASED INSPECTION OF PHARMACEUTICAL CONTAINERS

(71) Applicant: AMGEN INC., Thousand Oaks, CA (US)

(72) Inventors: Dmitry Fradkin, Woodland Hills, CA (US); Thomas Clark Pearson, Newbury Park, CA (US); Neelima Chavali, Newbury Park, CA (US); Erwin Freund, Camarillo, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,419

(22) Filed: Aug. 18, 2023

(65) Prior Publication Data

US 2023/0398577 A1    Dec. 14, 2023

Related U.S. Application Data

(63) Continuation of application No. 17/058,933, filed as application No. PCT/US2019/036671 on Jun. 12, 2019, now Pat. No. 11,766,700.

(Continued)

(51) Int. Cl.
*G06N 20/00*     (2019.01)
*B07C 5/342*     (2006.01)
(Continued)

(52) U.S. Cl.
CPC ......... *B07C 5/342* (2013.01); *G01N 21/9018* (2013.01); *G01N 35/0099* (2013.01);
(Continued)

(58) Field of Classification Search
CPC ...... B07C 5/342; G06T 7/97; G01N 21/9018; G01N 35/0099; G06N 20/00
See application file for complete search history.

(56) References Cited

U.S. PATENT DOCUMENTS

| | | | |
|---|---|---|---|
| 7,336,358 B2 | 2/2008 | Ganz et al. | |
| 7,532,327 B2 | 5/2009 | Bloom et al. | |

(Continued)

FOREIGN PATENT DOCUMENTS

| | | |
|---|---|---|
| CA | 3031468 A1 | 1/2018 |
| CN | 103189720 A | 7/2013 |

(Continued)

OTHER PUBLICATIONS

Search Report and Written Opinion in International Application No. PCT/US19/36671 dated Aug. 28, 2019, 17 pages.

(Continued)

*Primary Examiner* — Joseph C Rodriguez
(74) *Attorney, Agent, or Firm* — MARSHALL, GERSTEIN & BORUN LLP

(57) ABSTRACT

A robotic inspection platform comprises a robotic arm, an imager, and a controller. The controller causes the robotic arm to retrieve, using its end effector, a container, and to manipulate the container such that the container is sequentially placed in a plurality of orientations while in view of the imager. The controller also causes the imager to capture images, with each of the images being captured while the container is in a respective one of the orientations. The controller also determines one or more attributes of the container, and/or a sample within the container, by analyzing the images using a pattern recognition model and, based on the attribute(s), determines whether the container and/or sample satisfies one or more criteria. If the container and/or sample fails to satisfy the criteria, the controller causes the (Continued)

robotic arm to place the container in an area (e.g., bin) reserved for rejected containers and/or samples.

20 Claims, 5 Drawing Sheets

Related U.S. Application Data

(60) Provisional application No. 62/712,486, filed on Jul. 31, 2018.

(51) Int. Cl.
  *G01N 21/90* (2006.01)
  *G01N 35/00* (2006.01)
  *G06T 7/00* (2017.01)

(52) U.S. Cl.
  CPC ............ *G06N 20/00* (2019.01); *G06T 7/97* (2017.01); *B07C 2501/0063* (2013.01); *G06T 2207/20081* (2013.01)

(56) References Cited

U.S. PATENT DOCUMENTS

| | | | |
|---|---|---|---|
| 7,605,919 | B2 | 10/2009 | Oma et al. |
| 7,782,451 | B2 | 8/2010 | Matsumoto et al. |
| 7,796,254 | B2 | 9/2010 | Ganz et al. |
| 7,973,294 | B2 | 7/2011 | Gratton et al. |
| 9,418,416 | B2 | 8/2016 | Milne et al. |
| 9,619,881 | B2 | 4/2017 | Maddah et al. |
| 9,841,593 | B2 | 12/2017 | Olesen et al. |
| 9,904,842 | B2 | 2/2018 | Valvik et al. |
| 11,069,053 | B2 * | 7/2021 | Horowitz ............... G06V 20/52 |
| 11,334,980 | B2 * | 5/2022 | Vivet ................. G01N 35/1016 |
| 11,766,700 | B2 * | 9/2023 | Fradkin .............. G01N 21/9027 209/577 |
| 2003/0123057 | A1 | 7/2003 | Lemmo et al. |
| 2004/0072143 | A1 * | 4/2004 | Timmis ................... A01C 1/00 800/278 |
| 2005/0130220 | A1 | 6/2005 | Lemmo et al. |
| 2008/0001104 | A1 * | 1/2008 | Voigt ................. G01N 21/8851 250/559.46 |
| 2012/0330684 | A1 | 12/2012 | Jacobs et al. |
| 2013/0335557 | A1 | 12/2013 | Faber et al. |
| 2014/0142751 | A1 | 5/2014 | Takizawa |
| 2015/0213616 | A1 | 7/2015 | Kappeler et al. |
| 2015/0219557 | A1 * | 8/2015 | Skaff ...................... B07C 5/342 702/189 |
| 2016/0085940 | A1 * | 3/2016 | Jacobs ..................... H04N 7/18 705/2 |
| 2016/0144408 | A1 * | 5/2016 | Struijk ..................... B07C 5/38 209/580 |
| 2017/0097305 | A1 * | 4/2017 | Prinz ................. G01N 15/1456 |
| 2017/0242234 | A1 | 8/2017 | Ashcroft et al. |
| 2021/0318251 | A1 * | 10/2021 | Lu ........................... H04N 7/183 |
| 2022/0009110 | A1 * | 1/2022 | Schmitt ................. B25J 9/1697 |

FOREIGN PATENT DOCUMENTS

| | | |
|---|---|---|
| CN | 103817702 A | 5/2014 |
| CN | 105869154 A | 8/2016 |
| JP | 2007240434 A | 9/2007 |
| JP | 2016188844 A | 11/2016 |
| JP | 2018077718 A | 5/2018 |
| TW | M530737 U | 10/2016 |
| WO | WO-2018/017771 A1 | 1/2018 |
| WO | WO-2018/061196 A1 | 4/2018 |

OTHER PUBLICATIONS

"Machine vision", Wikipedia, downloaded from the Internet at: <https://en.wikipedia.org/w/index.php?title=Machine_vision&oldid=852670437> (Jul. 30, 2018).

European Patent Application No. 19844131.3, Extended European Search Report, dated Mar. 31, 2022.

Chinese Patent Application No. 201980044375.9, Office Action, issued May 5, 2022.

Singapore Patent Application No. 1120201307SV, Search Report and Written Opinion, dated Sep. 1, 2022.

Japanese Patent Application No. 2020-568969, Office Action, mailed Nov. 29, 2022.

* cited by examiner

ROBOTIC SYSTEM FOR PERFORMING PATTERN RECOGNITION-BASED INSPECTION OF PHARMACEUTICAL CONTAINERS

CROSS-REFERENCE TO RELATED APPLICATIONS

This application is a continuation of U.S. patent application Ser. No. 17/058,933, entitled "Robotic System For Performing Pattern Recognition-Based Inspection of Pharmaceutical Containers," filed on Nov. 25, 2020, which claims the benefit of International Application No. PCT/US2019/036671, entitled "Robotic System For Performing Pattern Recognition-Based Inspection of Pharmaceutical Containers," filed on Jun. 12, 2019, which claims the benefit of U.S. Provisional Patent Application No. 62/712,486, entitled "Robotic System For Performing Pattern Recognition-Based Inspection of Pharmaceutical Containers," filed on Jul. 31, 2018, the disclosure of each of which is hereby incorporated herein by reference.

FIELD OF THE DISCLOSURE

The present application relates generally to the inspection of pharmaceutical containers, such as syringes or vials, and/or the inspection of samples within such containers.

BACKGROUND

In certain contexts, such as quality control procedures for manufactured drug products, it is necessary to examine fluid or other (e.g., lyophilized) samples for the presence of various attributes, such as particles, bubbles or stains. Undesired particles or other attributes can originate from a number of different sources, such as the environment, incorrect handling or storage, or byproducts/residuals of forming, packaging, or filling. Depending on the context, certain types of attributes may be acceptable (e.g., bubbles), while others may be unacceptable (e.g., particles, specific types of particles, particles above a certain size and/or count, etc.). If unacceptable attributes are detected in a fluid sample, the fluid sample is rejected.

Image processing methods traditionally used to detect defects in large commercial inspection machines frequently struggle to achieve high accuracy when faced with challenging inspection tasks. This is particularly true for inspections that require evaluating samples in which defect and non-defect attributes can present themselves simultaneously, while also having a very similar appearance. For example, the inspection of liquid-filled syringes may entail discriminating particles or stains on the piston dome (defects) from innocuous bubbles on the piston dome (non-defects). For automated processes, this can make it difficult to ensure that defective samples are rejected at an acceptable rate (e.g., 100% of the time, or at least 99.99999% of the time, etc.), and difficult to ensure that conforming samples are approved (i.e., not falsely rejected) at an acceptable rate. The former circumstance may result in potentially dangerous situations, and the latter circumstance may result in higher costs due to the unnecessary discarding of acceptable product. While poor accuracy of an automated system may in some instances be compensated for by other means (e.g., repeated inspections, manual inspections, etc.), such approaches are generally expensive in terms of both time and cost. Similar drawbacks exist in connection with other quality procedures, such as when inspecting the containers themselves for defects.

SUMMARY OF THE DISCLOSURE

Embodiments described herein relate to a system that improves upon traditional inspection techniques. In particular, a robotic inspection platform uses pattern recognition (e.g., deep learning) models/techniques to perform inspection of pharmaceutical containers (e.g., syringes, vials, cartridges, etc.) and/or inspection of samples within such containers (e.g., fluids, lyophilized products, etc.), and can handle even highly challenging inspection tasks. The pattern recognition model may be capable of reliably discriminating between particles and bubbles in a fluid sample, for example, or between specific types of particles and specific types of bubbles, etc. The robotic inspection platform may also be configured to facilitate the initial (pre-production) development or training of pattern recognition models. In some embodiments and/or scenarios, the platform may be used to perform the primary (e.g., sole or initial) inspection of containers and/or samples. Alternatively, the platform may be used to re-inspect containers and/or samples that have already been identified as rejects, or potential rejects, by another automated inspection system (e.g., a conventional automated inspection system that is less reliable/accurate).

In embodiments where the platform implements a machine learning model, the model may be trained using a large data set of training images and a supervised learning technique. The platform may be used to capture the training images under controlled conditions (e.g., precise, repeatable container orientations and lighting conditions), after which a human analyst may manually label attributes of the training images. For example, the analyst may label/classify objects within the training images as specific object types. To capture the training images, a robotic arm of the platform may sequentially pick up each of a number of containers, present the containers in front of the imager, and manipulate (e.g., rotate) the containers while images are acquired at different angles/orientations. Containers with purposely introduced defects (and/or holding samples with purposely introduced defects) may be used in the training process to ensure that the human analyst will encounter a sufficiently broad range of defects and/or defect types when performing the classification task.

Once the model is trained and integrated, the platform may switch to a "production," "run-time," "operational" or "processing" mode in which the robotic arm retrieves new containers (possibly holding samples), and manipulates the containers in front of the imager in the same manner that was done during the training process. The images for each container may be saved in memory, and processed by a computer using the trained pattern recognition model. The computer may also process the model outputs by applying one or more criteria to determine whether the container is acceptable, or a "reject." If the container is rejected (due to a sample within the container having defects, and/or the container itself having defects), the robotic arm may place the container in a bin or other area specifically reserved for that purpose. The robotic inspection platform may be configured to inspect only containers, to inspect only product samples (e.g., fluids or lyophilized products within the containers), or to inspect both containers and samples, depending on the embodiment and/or the scenario. In one embodiment, for example, a single robotic inspection platform can perform any of these functions, so long as the appropriate machine learning models are deployed.

BRIEF DESCRIPTION OF THE DRAWINGS

The skilled artisan will understand that the figures, described herein, are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
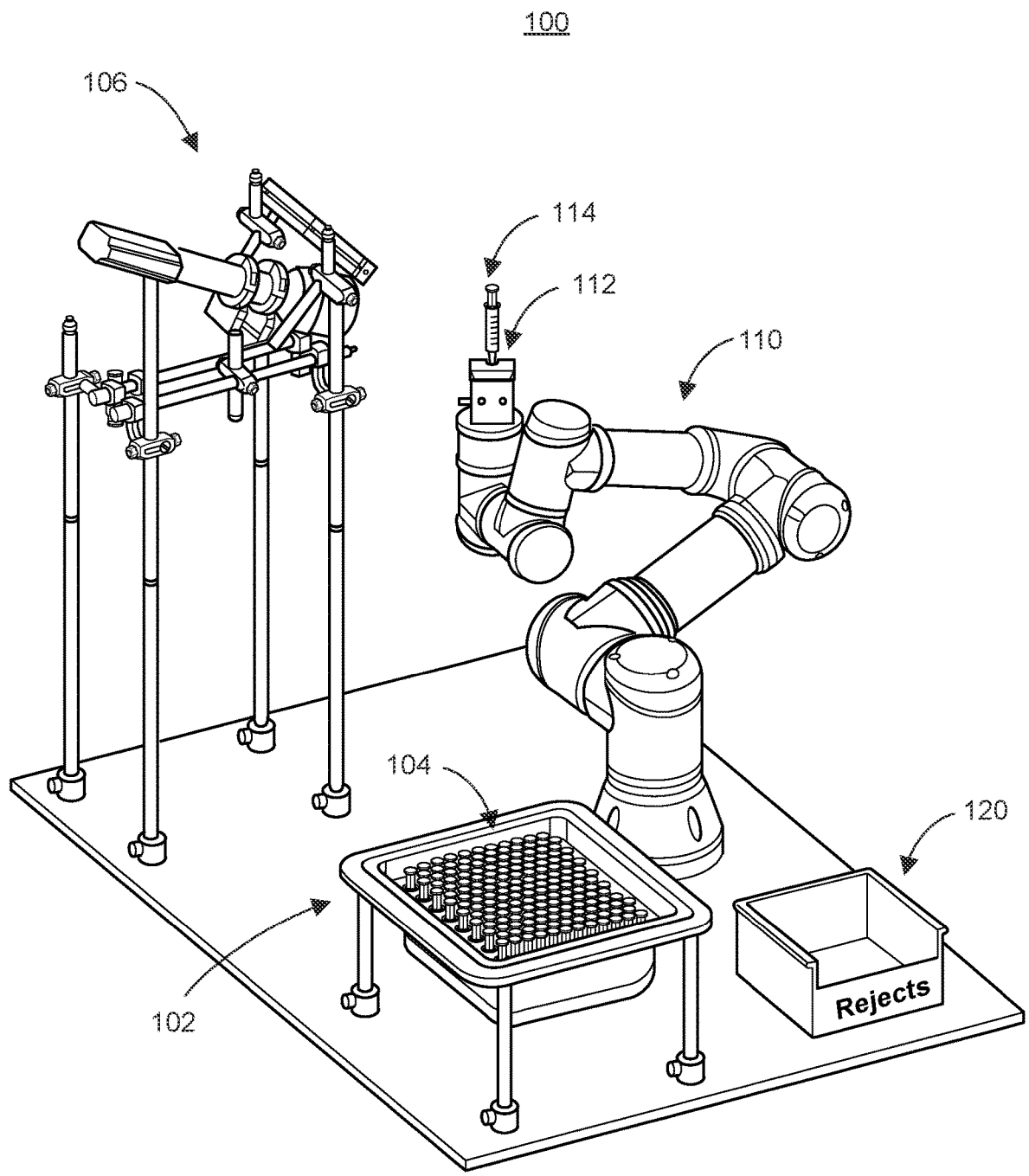
FIG. 1 illustrates an example robotic inspection platform, according to one embodiment.

FIG. 1 illustrates a robotic inspection platform 100, according to an embodiment of the present disclosure. Robotic inspection platform 100 includes a plate 102 containing a number of containers 104. Containers 104 may be wholly or partially transparent or translucent pharmaceutical containers, such as syringes, vials, cartridges, etc., and each may contain a sample (e.g., a fluid or lyophilized medical product). Alternatively, in some embodiments and/or scenarios (e.g., if robotic inspection platform 100 is only analyzing containers, rather than samples within those containers), containers 104 may be opaque. Each of containers 104 may be configured to receive any suitable volume of a sample, depending on the size and configuration of plate 102. For example, each of containers 104 may be able to hold tens of nanoliters of a fluid, or several milliliters of a fluid, etc. Plate 102 may include a number of cavities or wells (e.g., 80 wells, 96 wells, etc.) that are dimensioned so as to securely, but removably, hold containers 104.

Robotic inspection platform 100 also includes an imaging system 106, which is generally configured to illuminate containers such as containers 104, and to capture images of the illuminated containers. To this end, imaging system 106 may include a light source, an imager, and possibly one or more mirrors and/or other optical elements to redirect light from the light source and/or light scattered by samples (and/or the container itself) in a suitable manner. The light source may be a light-emitting diode (LED) light or any other suitable type of light source, may provide any suitable wavelength (or range of wavelengths) of light, and may include lights in one or multiple locations. The light source may have only fixed or manually-adjustable parameters, or may have one or more computer-controlled parameters (e.g., intensity, direction, etc.). While FIG. 1 shows only a single imager and one mirror, imaging system 106 may instead include multiple imagers positioned at different locations, multiple (or no) mirrors, and so on. The imager(s) may include any suitable combination of hardware and/or software, such as image sensors, optical stabilizers, image buffers, frame buffers, frame grabbers, charge-coupled devices (CCDs), complementary metal oxide semiconductor (CMOS) devices, and so on. In some embodiments, the imager(s) may include imaging devices operating in non-visual wavelengths, such as one or more infrared camera devices. Further, in some embodiments, the light source may include a number of lights having different configurations, orientations, parameters, etc., and the light source may be configured such that the different lights can be strobed. In this manner, different images may be acquired, with each image corresponding to a different light. Different ones of the strobed lights may be better suited to exposing different attributes of a container and/or sample, for example.

Robotic inspection platform 100 also includes a robotic arm 110. Robotic arm 110 has multiple articulable segments (e.g., seven segments capable of six degrees of freedom of movement), and an end effector 112. Joints connect the various segments, and the segments may be articulated using controllable step motors or other suitable means. Robotic arm 110 may incorporate motion and/or other sensors to provide control feedback, ensuring that robotic arm 110 moves in the intended manner within some tolerance threshold.

End effector 112 is depicted in FIG. 1 holding a container (e.g., syringe) 114, which robotic arm 110 retrieved from among containers 104 in plate 102. End effector 112 includes a material with suitable hardness for firmly fixing (e.g., grasping) containers, but also suitable for avoiding breakage of fragile (e.g., glass) containers. End effector 112 may operate by compressing container 114, or by inserting an element into container 114 and expanding outwardly. End effector 112 may incorporate one or more pressure sensors to provide control feedback, ensuring that end effector 112 provides the intended amount of force within some tolerance threshold.

Robotic arm 110 may include motors or other suitable means for rotational and/or translational manipulation/movement of objects held by end effector 112. For example, robotic arm 110 may be capable of adjusting roll, pitch and yaw angles of container 114 by rotating and/or tilting end effector 112 (for roll and pitch) and/or moving the articulable arm segments (for yaw). In some embodiments, robotic arm 110 is an off-the-shelf device, such as the UR3 robotic arm offered by Universal Robots (UR®).

Robotic inspection platform 100 also includes a reject bin 120 for discarding defective containers and/or samples. In the embodiment of FIG. 1, reject bin 120 is a simple container with four side walls, a base/floor, and an open top. In other embodiments, reject bin 120 may be constructed differently (e.g., a container including a top with an open slot, or a plate with wells similar to plate 102, etc.).

While not shown in FIG. 1, a controller is communicatively coupled to at least a portion of imaging system 106, and to robotic arm 110. The controller may be a general-purpose computing device that has been specifically programmed according to the embodiments described herein, or may be a dedicated controller device (e.g., dedicated processors integrated within imaging system 106 and/or robotic arm 110). One embodiment of the controller is discussed in more detail below, in connection with FIG. 3.

The controller coordinates operation of imaging system 106 and robotic arm 110 during run-time operation. "Run-time" operation, as the term is used herein, refers to operation of a robotic inspection platform (e.g., platform 100) in production, e.g., to apply quality control procedures after the manufacture and packaging of pharmaceutical containers and/or samples, prior to sale or other distribution. In some embodiments, the controller also coordinates operation of imaging system 106 and robotic arm 110 during training of a pattern recognition model prior to run-time operation, as discussed in further detail below.

During run-time operation, the controller generates command signals, and sends the command signals to imaging system 106 and/or robotic arm 110. Transmission of command/control signals is discussed further below, in connection with FIG. 3.

Control/operation of robotic inspection platform 100, according to one embodiment, will now be described. Initially, the controller causes robotic arm 110 to retrieve container 114 from plate 102 by fixing (e.g., grasping, suctioning, etc.) container 114 using end effector 112, and to move container 114 into a position where it may be clearly "seen" by the imager(s) of imaging system 106 (e.g., as shown in FIG. 1). The light source of imaging system 106 illuminates container 114 and the sample within (if any). The various components of imaging system 106 (e.g., imager(s), mirror(s), light source) are configured such that light from the light source passes through container 114, reflects or refracts off of, or is blocked by, objects within container 114 (e.g., particles, bubbles, etc.), and impinges upon the imager(s). In addition, or instead (e.g., if container 114 does not contain a sample), the light may reflect or refract off of, or be blocked by, various portions of container 114. The light source may be in an "on" state for an extended time period, or the controller may cause the light source to turn on at the appropriate times, for example.

The controller then causes the imager(s) to capture at least one image of container 114, and possibly also a sample within container 114. In some embodiments and/or applications where container 114 holds a sample, however, the controller first causes robotic arm 110 to agitate (e.g., shake, invert, etc.) container 114, shortly before imaging. After the initial image(s) is/are captured, the controller causes robotic arm 110 to manipulate end effector 112 such that container 114 is positioned in a series of different orientations. For example, container 114 may be rotated around its longitudinal axis in 20 degree increments (e.g., providing 18 different orientations in total), and/or tilted at various angles relative to the vertical position shown in FIG. 1. The orientations may precisely correspond to orientations that were used to obtain training images that were manually labeled by a human analyst, for example, as discussed further below. At each orientation, the controller may cause the imager(s) to capture one or more images of container 114 and the fluid sample within, i.e., the controller may synchronize imaging system 106 and robotic arm 110 using appropriately times command signals. In some embodiments, different lights in the light source of imaging system 106 (e.g., lights having different configurations, orientations, characteristics, etc.) are strobed for each orientation of container 114, with at least one image of container 114 being captured for each of the lights before container 114 is moved to the next orientation. Alternatively, robotic arm 110 may move container 114 through all of the orientations for a first light, then move container 114 through all of the orientations fora second light, and so on.

The controller may then process the captured images to determine whether container 114 (e.g., the container itself, or a sample within container 114) should be rejected. If rejected, robotic arm 110 discards container 114 by placing container 114 in reject bin 120. If not rejected, robotic arm 110 may place container 114 back in the well of plate 102 from which it was retrieved, or in another suitable location. Robotic arm 110 may repeat this process for each of containers 104 stored in plate 102, for example.

To determine whether a given container should be rejected, the controller may determine a number of attributes of the container and/or sample. The controller may determine the attribute(s) by analyzing the images of the container and/or sample, including images corresponding to the different orientations of container 114, using a pattern recognition model. Depending on the embodiment, the pattern recognition model may be a machine learning model (e.g., trained using supervised learning techniques), or a fully human-designed model (e.g., a heuristic model). Training of a machine learning model is discussed in further detail below.

An "attribute," as used herein, may broadly refer to any ascertainable quality or characteristic of the sample or container. For example, and without limitation, a fluid sample attribute may be the presence of one or more objects (e.g., particles or bubbles), the presence of one or more specific types of objects (e.g., specific particle types or bubble types, such as particles consisting of a particular material, or particles or bubbles having a particular size or being in a particular size range, etc.), the number of objects or specific types of objects, the size of objects or specific types of objects, the presence or size of a stain, and so on. As another example, a container attribute may be the presence of one or more chips or cracks, the presence of one or more specific types of chips or cracks (e.g., straight versus jagged cracks, or chips having at least a particular depth, etc.), the presence of one or more deformities (e.g., warping) on the container, the presence of a deformity on a specific part of the container (e.g., the plunger, flange, etc.), and so on. Thus, the pattern recognition model may operate by identifying and/or classifying objects, stains, chips, cracks, deformities, etc. As just one example, in an embodiment, the model may determine that certain pixels in a digital image, captured by an imager of imaging system 106, all correspond to a single object, and then classify the identified object as a bubble, a particle, a particular type of particle or bubble, etc. As used herein, the term "particle" refers to an object other than a gas-filled bubble, such as proteinaceous particulate matter, or glass lamellae, for example.

Depending on the embodiment, the controller may be configured to determine only a single attribute, or a number of different attributes, for a given container or sample. In some embodiments, for example, the pattern recognition model of the controller is trained or designed to determine a first set of attributes (e.g., to identify the presence of specific objects, and to classify those objects), after which the controller performs further processing to determine a second set of attributes (e.g., determining a count of identified and classified objects, measuring the size of an identified object, generating a histogram of particle sizes, etc.).

Figure 2:
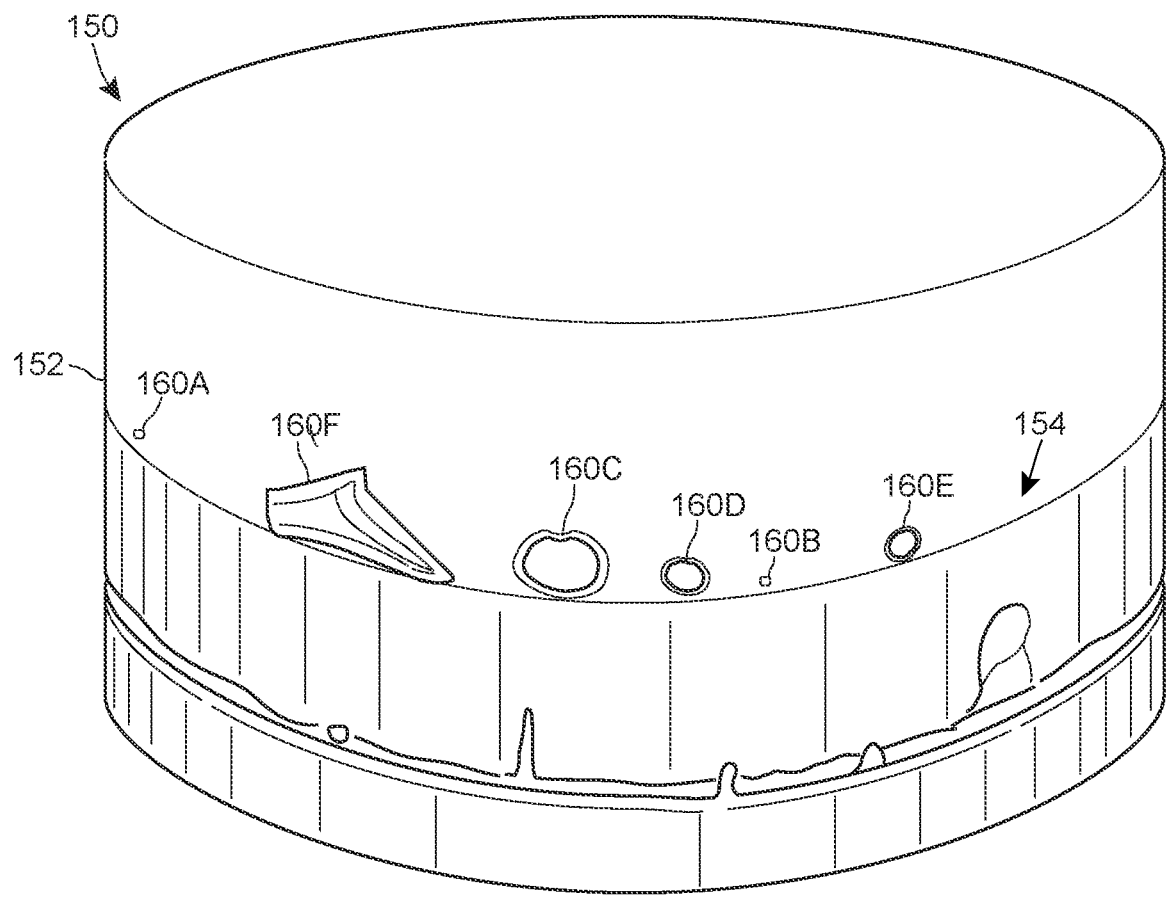
FIG. 2 illustrates a view of the plunger of a filled syringe sample, as an example syringe that may be inspected using the robotic inspection platform of FIG. 1.

One example of fluid sample attributes is shown in FIG. 2, which provides a close-up view of a plunger 150 of a liquid filled syringe. The syringe may be container 114 of FIG. 1, for example. As seen in FIG. 2, a side wall 152 surrounds the syringe contents (i.e., a fluid sample), and a surface 154 of a piston/dome on plunger 150 is covered by a number of objects 160, including bubbles 160A through 160E and a particle 160F. Bubbles 160A through 160E may be the result of agitation and/or chemical reactions, for example. Particle 160F may be a contaminant introduced during manufacture or processing of the fluid sample (or manufacture of the plunger 150, etc.), and may be innocuous or harmful. Other examples of possible defects, not shown in FIG. 2, may include stains and/or other attributes.

Referring now back to FIG. 1, the controller may reject a given container if the container, and/or a sample within the container, fails to satisfy one or more criteria, with the criteria being based at least in part on the determined attribute(s). The criteria may be relatively simple (e.g., a fluid sample is rejected if any particle or other non-bubble object is present within the sample), or more complex (e.g., a fluid sample is rejected if a "score" for the sample exceeds a threshold, where the controller calculates the score based on the number, type and size of particles in the sample and the number, type and size of bubbles in the sample). In embodiments where the controller is capable of inspecting different types of containers and/or samples (and/or different views/perspectives, etc.), the controller may store different sets of criteria for different container and/or sample types (and/or different views/perspectives, etc.).

Figure 3:
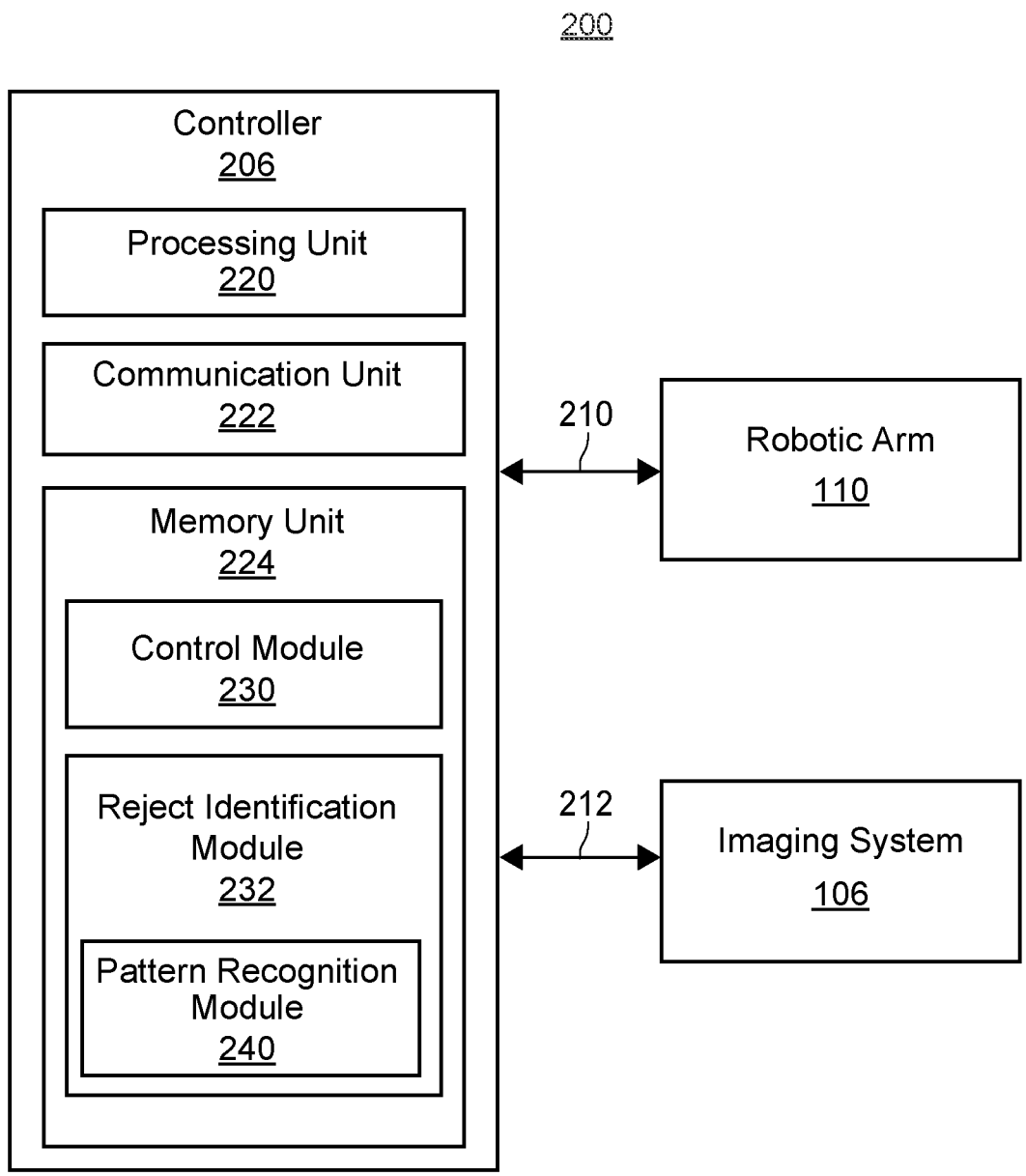
FIG. 3 is a block diagram of an example control system that may be associated with the robotic inspection platform of FIG. 1, according to one embodiment.

An example embodiment of the controller will now be described with reference to FIG. 3. As seen in FIG. 3, a control system 200 may include a controller 206 (e.g., the controller discussed above). Controller 206 is configured to communicate with and control various components of robotic inspection platform 100 of FIG. 1, including robotic arm 110 and imaging system 106. In other embodiments, control system 200 may be used to control a robotic inspection platform different than platform 110 of FIG. 1.

In an embodiment, control system 200 is configured to facilitate fully autonomous or semi-autonomous operation of robotic inspection platform 100. In particular, control system 200 may support the automatic manipulation and analysis of containers, such as container 104 (e.g., in the manner discussed above). Controller 206 may be implemented, for example, as any suitable combination of hardware and/or software coupled to or otherwise in communication with robotic arm 110 and imaging system 106. For example, controller 206 may be implemented as a device mounted to, or integrated within, a stage on which robotic arm 110 and/or imaging system 106 are mounted. Alternatively, controller 206 may be located remotely from robotic inspection platform 100.

In any event, controller 206 may be coupled to robotic arm 110 and/or imaging system 106 via wired links, wireless links, or any suitable combination thereof. Accordingly, in FIG. 3, links 210 and/or 212 may each represent one or more wired and/or wireless links to facilitate communications between controller 206 and one or both of robotic arm 110 and imaging system 106. Although two separate links 210 and 212 are shown in FIG. 3, it is understood that controller 206 may communicate with robotic arm 110 and imaging system 106 via any suitable number of links, such as a single shared link or bus, for example.

To facilitate communication with and control of robotic arm 110 and imaging system 106, controller 206 may include a processing unit 220, a communication unit 222, and a memory unit 224. Processing unit 220 may be implemented as any suitable type and/or number of processors, such as a host processor of controller 206, for example. To provide additional examples, processing unit 220 may be implemented as an application specific integrated circuit (ASIC), an embedded processor, a central processing unit (CPU) associated with controller 206, etc. While not shown in FIG. 3, processing unit 220 may be coupled with (and/or otherwise configured to communicate with, control, operate in conjunction with, and/or affect the operation of) communication unit 222 and/or memory unit 224 via one or more wired and/or wireless interconnections, such as any suitable number of data and/or address buses, for example.

For example, processing unit 220 may be configured to retrieve, process, and/or analyze data stored in memory unit 224 (e.g., images captured by one or more imagers of imaging system 106), to store such data to memory unit 224, to replace data stored in memory unit 224, to control various functions associated with robotic arm 110 (e.g., any of the robotic arm functions described herein) and/or imaging system 106 (e.g., any of the imaging functions described herein), and so on.

Communication unit 222 may be configured to support any suitable number and/or type of communication protocol(s) to facilitate communications between controller 206 and one or both of robotic arm 110 and imaging system 106. Communication unit 222 may be configured to facilitate the exchange of any suitable type of information between controller 206 and one or both of robotic arm 110 and imaging system 106 (e.g., via links 210 and/or 212), and may be implemented as any suitable combination of hardware and/or software to facilitate such functionality. For example, communication unit 222 may be implemented with any number of wired and/or wireless transceivers, modems, ports, input/output interfaces, connectors, antennas, etc. While not shown in FIG. 3, robotic arm 110 and/or imaging system 106 may include similar types of communication units to enable communication via links 210 and/or 212.

In accordance with various embodiments, memory unit 224 may be one or more computer-readable, non-transitory storage devices that include(s) any suitable volatile memory (e.g., a random access memory (RAM)), non-volatile memory (e.g., battery-backed RAM, FLASH, etc.), or a combination thereof. Memory unit 224 may be configured to store instructions that can be executed by processing unit 220. These instructions may include machine-readable instructions that, when executed by processing unit 220, cause processing unit 220 to perform various acts as described herein. While various functions of controller 206 are described herein in terms of the execution of instructions stored in memory unit 224 by processing unit 220, it will be understood that equivalent functions may instead be realized exclusively using hardware components (e.g., a hardware processor). Memory unit 224 may also be configured to store any other suitable data used in conjunction with robotic inspection platform 100, such as images captured by the imager(s) of imaging system 106, data indicating identified sample and/or container attributes, and so on.

Control module 230 is a set of instructions in memory unit 224 that, when executed by processing unit 220, cause processing unit 220 to perform various acts in accordance with applicable embodiments as described herein. In an embodiment, control module 230 includes instructions that, when executed by processing unit 220, cause processing unit 220 to transmit one or more commands to robotic arm 110 to control the operation (e.g., movements) of robotic arm 110, e.g., as described above in connection with FIG. 1. Moreover, control module 230 may include instructions that, when executed by processing unit 220, cause processing unit 220 to transmit one or more commands to imaging system

106 to control the operation of imaging system 106, e.g., as described above in connection with FIG. 1.

For example, processing unit 220 may transmit, via communication unit 222, commands to robotic arm 110 that cause robotic arm 110 to sequentially retrieve containers 104 from plate 102, place each of containers 104 in view of one or more imagers of imaging system 106, and manipulate each of containers 104 to assume multiple orientations while in view of the imager(s). Alternatively, processing unit 220 may transmit, via communication unit 222, commands to imaging system 106 that cause the imager (or imagers) to move relative to the stationary container (e.g., rotate around the container while facing the container such that the container remains within view). In either case, over the same time frame, processing unit 220 may transmit, via communication unit 222, commands to imaging system 106 that cause the imager(s) to capture images of each of containers 104 while in each of the aforementioned relative orientations, and to provide those images to controller 206 for storage in memory unit 224. In some embodiments, processing unit 220 also transmits, via communication unit 222, commands to imaging system 106 that cause a light source of imaging system 106 to turn on and off at appropriate times (e.g., such that each of containers 104 is illuminated when images are captured), and/or to set other parameters of such a light source (e.g., intensity level, wavelength(s), etc.).

Reject identification module 232 is a set of instructions in memory unit 224 that, when executed by processing unit 220, cause processing unit 220 to perform various acts in accordance with applicable embodiments as described herein. In an embodiment, reject identification module 232 includes instructions that, when executed by processing unit 220, cause processing unit 220 to process the container/sample images received from imaging system 106 using a pattern recognition module 240.

Pattern recognition module 240 may process images (e.g., one per container, one per orientation, or multiple per orientation) using any suitable pattern recognition model, in order to determine one or more attributes of the containers and/or samples corresponding to those images. In some embodiments, pattern recognition module 240 implements a machine learning model trained using supervised learning, as discussed further below. Generally, the pattern recognition model may use any suitable technique(s), such as parametric or nonparametric classification algorithms, neural networks, support vector machines, and so on. Pattern recognition module 240 is trained or designed to identify specific attributes, such as any of the attributes discussed herein (e.g., objects, specific object types, structural defects, etc.), for instance.

In some embodiments, pattern recognition module 240 implements a trained machine learning model that accepts an input (e.g., one or more images of the container), and passes the input once through the trained model to produce an output (e.g., one or more attribute classifications for the container and/or a sample therein) in a process referred to as performing an "inference." Any suitable technologies or advances relating to hardware or other processing units (e.g., FPGAs, ASICs, graphics processing units (GPUs), etc.) may be used to perform such inferences very quickly, resulting in very fast and efficient inspections of containers and/or samples.

In some embodiments, pattern recognition module 240 outputs not only classifications/labels/categories that denote specific container and/or sample attributes, but also confidence scores reflecting how probable it is that the classifications are correct. For example, pattern recognition module 240 may output the value [particle, 0.67222] to indicate it is 67.222% likely that a unique particle is present in a sample, the value [particle A, 0.853] to indicate it is 85.3% likely that the sample contains a unique particle of type A, or the value [3, particle A, 0.510] to indicate it is 51% likely that the sample contains exactly three particles of type A, etc.

In some embodiments, reject identification module 232 is configured to determine additional attributes that are not output by pattern recognition module 240. For example, reject identification module 232 may determine/measure the size of objects that have been classified by pattern recognition module 240, and/or determine/count the number of objects in a certain class, etc. Regardless of whether reject identification module 232 determines any additional attributes, reject identification module 232 may use the determined attributes (and possibly also corresponding confidence scores) to determine whether the container should be rejected, i.e., whether the container and/or sample fails to satisfy one or more criteria.

For example, reject identification module 232 may reject containers holding samples for which pattern recognition module 240 has identified a threshold number of particles and/or bubbles in the corresponding images, a threshold number of a particular type of particle and/or bubble, or a threshold number of a particular type of bubble having at least a threshold size, etc. In some embodiments, reject identification module 232 calculates a score that is a mathematical function of attributes and confidence scores, with a container being rejected if the score is above (or alternatively, below) a predetermined threshold. After reject identification module 232 determines whether a given container should be rejected, processing unit 220 may transmit, via communication unit 222, a command to robotic arm 110 that causes robotic arm 110 to place the container either in reject bin 120 (if rejected), or back in plate 102 or another suitable location (if not rejected).

In some embodiments, as noted above, robotic inspection platform 100 may be used not only to analyze samples (and/or the containers themselves) using a trained machine learning model, but also to facilitate the training of that model. In such embodiments, processing unit 220 may implement a process whereby images of training containers (i.e., containers holding training samples, or empty training containers) are captured and presented to a human analyst for manual labeling, with the labeled images being used in a supervised learning process. In particular, processing unit 220 may transmit, via communication unit 222, commands to robotic arm 110 that cause robotic arm 110 to sequentially retrieve training containers from a plate (e.g., similar to plated 102) or other suitable source area, to place each of the training containers in view of the imager(s) of imaging system 106, and manipulate each of the training containers to assume multiple orientations while in view of the imager(s). Over the same time frame, processing unit 220 may transmit, via communication unit 222, commands to imaging system 106 that cause the imager(s) of imaging system 106 to capture images of each of the training containers while the container (or alternatively, the imager(s)) is in a number of different orientations, and to provide those training images to controller 206 for storage in memory unit 224. In some embodiments, processing unit 220 also transmits, via communication unit 222, commands to imaging system 106 that cause the light source of imaging system 106 to turn on and off at appropriate times (e.g., such that each of the training containers is illuminated when the training images are captured), and/or to set other parameters of such a light source (e.g., intensity level, wavelength(s), etc.).

Generally, processing unit 220 may cause robotic inspection platform 100 to operate in the same manner as run-time operation. For example, the training sample containers (or imager(s)) may be manipulated to assume the same orientations that are later used during run-time operation, as described above. If the light source has computer-controllable parameters (e.g., intensity, wavelength, etc.), the training process may also include processing unit 220 transmitting commands that cause the same light source parameters to be present during training as will later be used during run-time operation. For any parameters or configurations of the light source that are manually adjustable, it is generally important that the parameter/configuration be the same, or at least very similar, during both training and run-time operation.

The human analyst(s) may label the training images in various ways, depending on the embodiment. For example, processing unit 220 may store the training images in memory unit 224, and generate a graphical user interface (GUI) that presents the stored images for a given training container. Processing unit 220 may also provide various interactive features that assist the analyst in the labeling process. In one such embodiment, the analyst may drag or draw a rectangle or other polygon around an object or other attribute in the image, and type in (or select from a menu, etc.) a classification for the enclosed attribute. With reference to FIG. 2, for example, an analyst viewing the depicted image of the syringe 150 may draw a rectangle around particle 160F, and type or select a particle type that he or she believes to accurately describes particle 160F. As another example, the analyst may draw a rectangle around bubble 160C, and type or select "bubble" (or a specific bubble type) as the label, etc.

Figure 4:
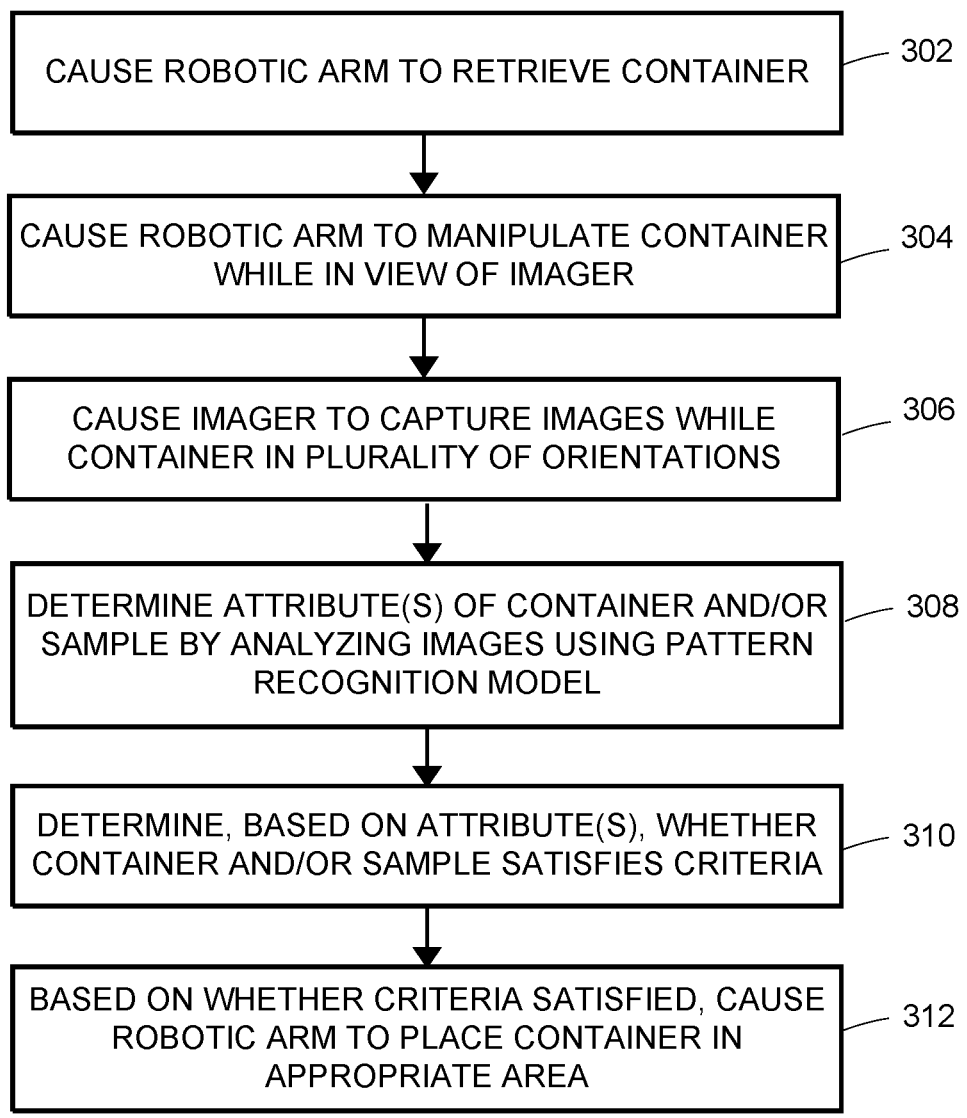
FIG. 4 is a flow diagram of an example method for performing inspection of containers and/or samples using pattern recognition, according to one embodiment.

FIG. 4 is a flow diagram depicting an example method 300 for performing inspection of containers (i.e., samples within containers, and/or the containers themselves) using pattern recognition, according to one embodiment. The method 300 may be implemented in whole or in part by controller 206, robotic arm 110, and/or imaging system 106, for example. In some embodiments, all of the method 300 is performed by processing unit 220 of controller 206, when executing instructions stored in memory unit 224.

In the method 300, a robotic arm is caused to retrieve a container using an end effector of the robotic arm (block 302). The robotic arm may be similar to robotic arm 110 of FIGS. 1 and 3, for example, and the end effector may be similar to end effector 112 of FIG. 1. The container may be a syringe, a vial, a cartridge, or any other type of vessel that may or may not contain a sample (e.g., a fluid or lyophilized product), depending on the embodiment. Block 302 may be performed by generating one or more command signals and transmitting the signal(s) to the robotic arm (e.g., a slave controller within the robotic arm), for example.

The robotic arm is caused to manipulate the container using the end effector (block 304), such that the container is sequentially placed in a plurality of orientations while the container is in view of an imager (e.g., an imager of imaging system 106 of FIG. 1). In some embodiments, the container is simultaneously positioned in view of one or more additional imagers (e.g., three imagers total, each separated by 120 degrees within a two-dimensional plane). Block 304 may be performed by generating one or more command signals and transmitting the signal(s) to the robotic arm (e.g., a slave controller within the robotic arm), for example.

The imager is caused to capture a plurality of images (block 306), with each of the images being captured while the container is in a respective one of the orientations. The orientations may include different rotational positions relative to a longitudinal axis of the container (e.g., every 20 degrees of a full circle, or every 90 degrees, etc.), for example. Block 306 may be performed by generating one or more command signals and transmitting the signal(s) to the imager (e.g., a slave controller within the imager), for example. Block 306 may further include receiving images captured by the imager, and storing those images in memory (e.g., memory unit 224 of FIG. 3).

In an alternate embodiment, block 304 instead (or also) includes causing the imager (or multiple imagers) to move relative to the container, such that the relative orientation between the container and imager(s) change(s), without necessarily requiring any additional movement (e.g., rotating) of the container via the robotic arm end effector. For example, the container may remain stationary once it is initially put into position by the robotic arm, and an imager may travel a circular path around the container (e.g., in 20 degree increments around a full circle). In such an embodiment, block 306 may include causing the imager to capture one or more images at each position of the imager.

One or more attributes of the container and/or sample is/are determined by analyzing the images captured at block 306 using a pattern recognition model (block 308). The attribute(s) may be determined by analyzing the container and/or sample using a machine learning model, for example, with the model having been trained to classify container and/or sample attributes (e.g., using supervised learning techniques). The attributes may include the presence of objects in general, the presence of specific types of objects, the presence of stains or types of stains, the presence of container cracks or deformities, and/or other attributes.

Based on the attribute(s) determined at block 308, it is determined whether the container and/or sample satisfies one or more criteria (block 310). The criteria may include at least one criterion that is dependent upon object type (e.g., whether the sample contains a particle, a bubble, a specific type of particle or bubble, etc.), for instance. The one or more criteria may also take into account confidence levels/scores associated with one or more of the attributes.

Based on whether the one or more criteria is are/satisfied, the robotic arm is caused (block 312) to either place the container in an area reserved for rejected containers and/or samples (e.g., reject bin 120 of FIG. 1), or place the container in an area reserved for containers and/or samples that have not been rejected (e.g., plate 102 of FIG. 1). Block 312 may be performed by generating one or more command signals and transmitting the signal(s) to the robotic arm (e.g., a slave controller within the robotic arm), for example.

In some embodiments, the method 300 includes one or more additional blocks not shown in FIG. 4. In some embodiments where a machine learning model is used at block 306, for example, the method 300 may include a number of additional blocks prior to block 302 that correspond to training of the machine learning model. For example, the method 300 may include an additional block in which the robotic arm is caused to sequentially retrieve, using the end effector, a plurality of training containers. For each of the retrieved training containers, the method may include causing the robotic arm to manipulate the container using the end effector such that the container is sequentially placed in the plurality of orientations while the container is in view of the imager, causing the imager to capture a respective training image (with each of the respective training images being captured while the training container is in a respective one of the orientations), and causing the respective images to be presented to a user via a display to facilitate manual labeling of attributes for the training container and/or a sample within the training container. These additional blocks may include generating command signals and transmitting the signals to the appropriate destinations (e.g., slave controllers of the robotic arm and imager), for example.

Figure 5:
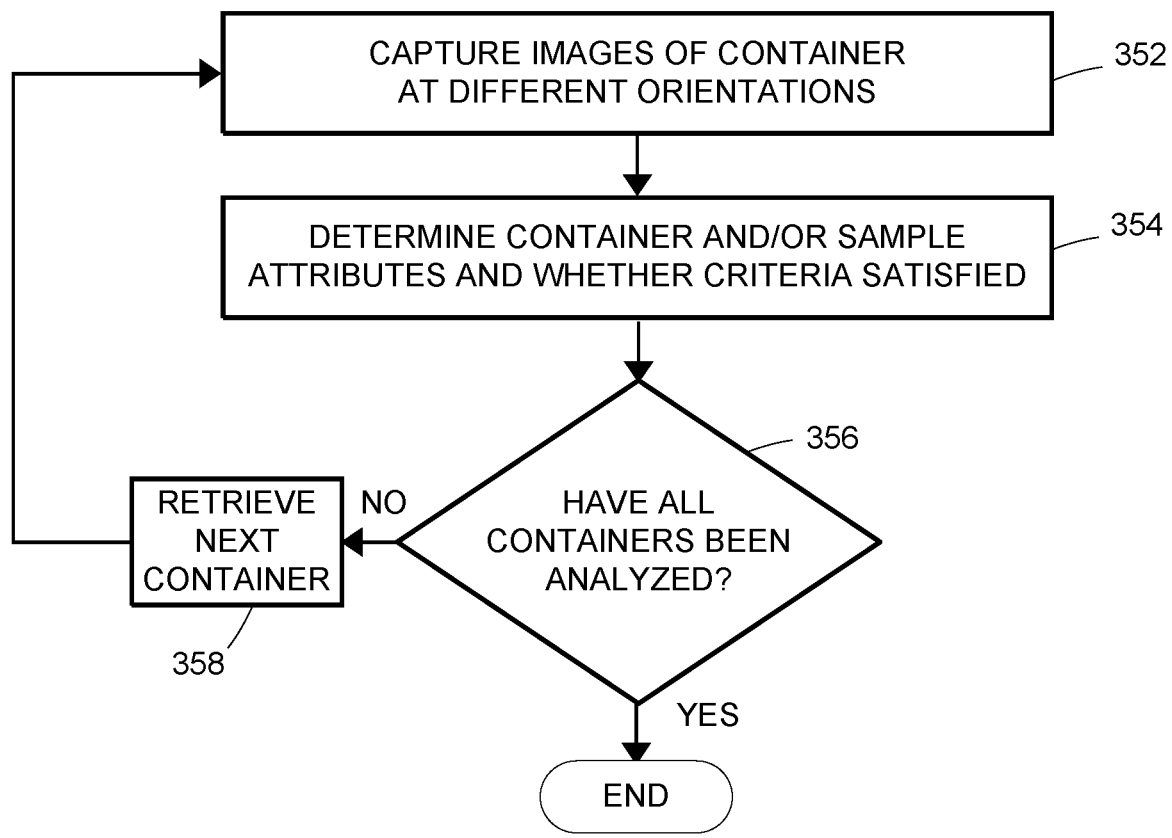
FIG. 5 is a flow diagram of an example method for performing inspection of a set of containers and/or samples contained therein, which may be used in conjunction with the method of FIG. 4.

FIG. 5 is a flow diagram of an example method 350 for performing inspection of a set of containers, according to one embodiment. The method 350 may be implemented in whole or in part by controller 206 (e.g., processing unit 220), robotic arm 110, and/or imaging system 106, for example. As discussed further below, the method 350 may be used in conjunction with the method 300 of FIG. 4.

The method 350 may begin by capturing images of a container at different orientations (block 352), and processing the captured images to determine attributes of the container (and/or a sample within the container) and whether one or more criteria are satisfied (block 354). The container may be classified as a reject if the one or more criteria are not satisfied, or as acceptable if the one or more criteria are satisfied. For a given container, block 352 may correspond to blocks 302 through 306 of the method 300, and block 354 may correspond to blocks 308 and 310 of the method 300, for example.

Once a given container has been analyzed and classified as either a reject or acceptable, the method 350 may include determining whether all containers selected for analysis have yet been analyzed (block 356). This determination may be made, for example, by tracking the overall number of containers that have been analyzed for a given type of plate, which has a known number of containers (e.g., 24 or 96), and determining whether this count is less than or equal to the overall number of containers. Alternatively, the determination may be made, for example, by a user entering any suitable number of containers for analysis (which may be less than all containers in the plate), tracking the overall number of containers that have been analyzed, and determining whether this count is less than or equal to the entered number of containers being tested.

In any event, if additional containers need to be analyzed, then the method 350 continues by retrieving the next container (block 358). Once the next container is properly positioned, the method 350 may repeat the process by capturing images of that container and/or a sample within (block 352). Conversely, if the analyzed container was the last container to be analyzed, the method 350 ends. Upon ending (or in parallel with the iterations of block 354), the method 350 may include storing or outputting a report of the analysis of each container (e.g., in memory unit 224, as shown in FIG. 3). Once this report is completed, a user may view the report and/or start the process over with a new plate.

Some of the Figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

Embodiments of the disclosure relate to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents unless the context clearly dictates otherwise.

As used herein, relative terms, such as "above," "below," "up," "left," "right," "down," "top," "bottom," "vertical," "horizontal," "side," "higher," "lower," "upper," "over," "under," "inner," "interior," "outer," "exterior," "front," "back," "upwardly," "lower," "downwardly," "vertical," "vertically," "lateral," "laterally" and the like refer to an orientation of a set of components with respect to one another; this orientation is in accordance with the drawings, but is not required during manufacturing or use.

As used herein, the terms "connect," "connected," and "connection" refer to an operational coupling or linking. Connected components can be directly or indirectly coupled to one another, for example, through another set of components.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed is:

1. A robotic inspection platform, comprising:
    a robotic arm comprising an end effector and a plurality of articulable segments, the robotic arm being configured to manipulate containers with greater than four degrees of freedom of movement;
    an imaging system comprising a single imager; and
    a controller configured to:
        cause the robotic arm to retrieve, using the end effector, a container,
        cause the robotic arm to manipulate the container using the end effector, such that the container is sequentially placed in a plurality of orientations while the container is in view of the single imager,
        cause the single imager to capture a plurality of images, with each of the plurality of images being captured while the container is in a respective one of the plurality of orientations,
        determine one or more attributes of the container, or a sample within the container, by analyzing the plurality of images using a pattern recognition model, and
        based on the one or more attributes of the container or the sample, either (i) cause the robotic arm to place the container in an area reserved for rejected containers and/or samples, or (ii) cause the robotic arm to place the container in an area reserved for containers and/or samples that have not been rejected.

2. The robotic inspection platform of claim 1, wherein the controller is configured to determine the one or more attributes of the container or the sample by analyzing the plurality of images using a machine learning model, the machine learning model being trained to classify container and/or sample attributes.

3. The robotic inspection platform of claim 2, wherein the controller is configured to facilitate training of the machine learning model at least by:
    causing the robotic arm to sequentially retrieve, using the end effector, a plurality of training containers; and
    for each of the plurality of training containers that is retrieved, (i) causing the robotic arm to manipulate the training container using the end effector such that the training container is sequentially placed in the plurality of orientations while the training container is in view of the single imager, (ii) causing the single imager to capture a respective plurality of training images, with each of the respective plurality of training images being captured while the training container is in a respective one of the plurality of orientations, and (iii) causing the respective plurality of images to be presented to a user via a display to facilitate manual labeling of attributes for the training container and/or a sample within the training container.

4. The robotic inspection platform of claim 1, wherein the controller is configured to distinguish between different types of objects by analyzing the plurality of images using the pattern recognition model.

5. The robotic inspection platform of claim 4, wherein the different types of objects include bubbles and particles.

6. The robotic inspection platform of claim 4, wherein the different types of objects include one or both of (i) specific types of bubbles and (ii) specific types of particles.

7. The robotic inspection platform of claim 4, wherein the controller is further configured to distinguish between the different types of objects based on one or more criteria that include at least one criterion dependent upon object type.

8. The robotic inspection platform of claim 1, wherein the plurality of orientations includes a plurality of rotations about a longitudinal axis of the container.

9. The robotic inspection platform of claim 1, wherein the area reserved for rejected containers and/or samples is a bin.

10. The robotic inspection platform of claim 1, wherein the controller is configured to cause the robotic arm to retrieve the container from a plate, and wherein the area reserved for containers and/or samples that have not been rejected is an area within the plate.

11. The robotic inspection platform of claim 1, wherein the robotic arm is configured to manipulate the containers with six degrees of freedom of movement, and
    wherein the container has a first roll angle and a first pitch angle in a first orientation of the plurality of orientations, and the container has (i) a second roll angle that is different from the first roll angle or (ii) a second pitch angle that is different from the first pitch angle in a second orientation of the plurality of orientations.

12. A method for performing inspection of containers using pattern recognition, the method comprising:
    causing a robotic arm to retrieve, using an end effector of the robotic arm, a container, the robotic arm being configured to manipulate containers with greater than four degrees of freedom of movement;
    causing the robotic arm to manipulate the container using the end effector, such that the container is sequentially placed in a plurality of orientations while the container is in view of a single imager;

causing the single imager to capture a plurality of images, with each of the plurality of images being captured while the container is in a respective one of the plurality of orientations;

determining one or more attributes of the container, or a sample within the container, by analyzing the plurality of images using a pattern recognition model; and based on the one or more attributes of the container or the sample, either (i) causing the robotic arm to place the container in an area reserved for rejected containers and/or samples, or (ii) causing the robotic arm to place the container in an area reserved for containers and/or samples that have not been rejected.

13. The method of claim 12, wherein determining the one or more attributes of the container or the sample by analyzing the plurality of images using a pattern recognition model includes:

determining the one or more attributes of the container or the sample by analyzing the plurality of images using a machine learning model, the machine learning model being trained to classify container and/or sample attributes.

14. The method of claim 13, further comprising facilitating training of the machine learning model at least by:

causing the robotic arm to sequentially retrieve, using the end effector, a plurality of training containers; and for each of the plurality of training containers that is retrieved, (i) causing the robotic arm to manipulate the training container using the end effector such that the training container is sequentially placed in the plurality of orientations while the training container is in view of the single imager, (ii) causing the single imager to capture a respective plurality of training images, with each of the respective plurality of training images being captured while the training container is in a respective one of the plurality of orientations, and (iii) causing the respective plurality of images to be presented to a user via a display to facilitate manual labeling of attributes for the training container and/or a sample within the training container.

15. The method of claim 12, wherein determining the one or more attributes of the container or the sample by analyzing the plurality of images using the pattern recognition model includes distinguishing between different types of objects by (i) analyzing the plurality of images using the pattern recognition model, and (ii) based on one or more criteria that include at least one criterion dependent upon object type.

16. The method of claim 12, wherein the plurality of orientations includes a plurality of rotations about a longitudinal axis of the container.

17. The method of claim 12, wherein the robotic arm is configured to manipulate the containers with six degrees of freedom of movement, and wherein the container has a first roll angle and a first pitch angle in a first orientation of the plurality of orientations, and the container has (i) a second roll angle that is different from the first roll angle or (ii) a second pitch angle that is different from the first pitch angle in a second orientation of the plurality of orientations.

18. A method for performing inspection of containers using pattern recognition, the method comprising:

causing a robotic arm to retrieve, using an end effector of the robotic arm, a container;

causing a single imager to be sequentially placed in a plurality of orientations while the container is in view of the single imager;

causing the single imager to capture a plurality of images of the container, with each of the plurality of images being captured while the single imager is in a respective one of the plurality of orientations;

determining one or more attributes of the container or a sample within the container by analyzing the plurality of images using a pattern recognition model; and based on the one or more attributes of the container or the sample, either (i) causing the robotic arm to place the container in an area reserved for rejected containers and/or samples, or (ii) causing the robotic arm to place the container in an area reserved for containers and/or samples that have not been rejected.

19. The method of claim 18, wherein determining the one or more attributes of the container or the sample by analyzing the plurality of images using a pattern recognition model includes:

determining the one or more attributes of the container or the sample by analyzing the plurality of images using a machine learning model, the machine learning model being trained to classify container and/or sample attributes.

20. The method of claim 19, further comprising facilitating training of the machine learning model at least by:

causing the robotic arm to sequentially retrieve, using the end effector, a plurality of training containers; and for each of the plurality of training containers that is retrieved, (i) causing the single imager to be sequentially placed in the plurality of orientations while the training container is in view of the single imager, (ii) causing the single imager to capture a respective plurality of training images, with each of the respective plurality of training images being captured while the single imager is in a respective one of the plurality of orientations, and (iii) causing the respective plurality of images to be presented to a user via a display to facilitate manual labeling of attributes for the training container and/or a sample within the training container.

* * * * *